(12) United States Patent
Lu et al.

(10) Patent No.: US 11,138,202 B2
(45) Date of Patent: Oct. 5, 2021

(54) TECHNIQUES FOR DETERMINING AND PRESENTING DATASET JOIN CANDIDATES

(71) Applicant: salesforce.com, inc., San Francisco, CA (US)

(72) Inventors: Chang Lu, Vancouver (CA); Lingtao Zhang, Coquitlam (CA); Amit Kumar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 254 days.

(21) Appl. No.: 16/525,199

(22) Filed: Jul. 29, 2019

(65) Prior Publication Data

US 2021/0034618 A1 Feb. 4, 2021

(51) Int. Cl.
*G06F 16/2455* (2019.01)
*G06F 17/15* (2006.01)
*G06F 16/26* (2019.01)

(52) U.S. Cl.
CPC .......... *G06F 16/2456* (2019.01); *G06F 16/26* (2019.01); *G06F 17/15* (2013.01)

(58) Field of Classification Search
CPC ....... G06F 16/2456; G06F 17/15; G06F 16/26
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Cam Y T Truong
(74) *Attorney, Agent, or Firm* — Jaffery Watson Mendonsa & Hamilton LLP

(57) ABSTRACT

Examples are described herein that relate to determining a level of relatedness between datasets. An approximation can be made of whether an entry in a first dataset appears in a same row as an entry in a second dataset. The approximation can be made by grouping entries in the second dataset together and determining an occurrence that an entry occurs in a same row as any of the entries in a grouping of entries. A test of independence between datasets can be made based at least on the occurrence values. Datasets can be ranked according to level of independence and presented to a user as candidates to join with a dataset. Occurrence values or rankings can be precomputed and available for use so that join candidates can be presented with a little amount of perceived delay to a user. A user interface can present join candidates for a dataset and allow the user the select datasets for joining. Joining of first and second datasets can supplement entries in both of the datasets and create a third dataset.

22 Claims, 13 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0157711 A1* | 6/2009 | Baer .................... G06F 16/252 |
| 2009/0177744 A1 | 7/2009 | Marlow et al. |
| 2015/0026159 A1* | 1/2015 | Berkman ............ G06F 16/9535 |
| | | 707/722 |
| 2015/0142807 A1* | 5/2015 | Hofmann ................ G06N 3/02 |
| | | 707/737 |
| 2017/0139992 A1 | 5/2017 | Morin |
| 2018/0081921 A1 | 3/2018 | Willcock et al. |
| 2019/0236191 A1 | 8/2019 | Petschulat et al. |

* cited by examiner

FIGURE 7
FIGURE 8
| Name | Phone Number | Email |
|---|---|---|
| Arthur Bird | 123-321-1242 | arty@mail.com |
| Arthur Bird | 401.131.9684 | mrbird@email.net |
| Arthur Bird | 501-247-6247 | arty@mail.com |
| Bird Caller | 216 431 7800 | mrbird@email.net |
FIGURE 9

TECHNIQUES FOR DETERMINING AND PRESENTING DATASET JOIN CANDIDATES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate to data management, and more specifically to determining overlaps between different datasets.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents, databases, datasets, and other files.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 7 depicts an example of a first dataset.

FIG. 8 depicts an example of a second dataset.

FIG. 9 depicts an example dataset that results from a joining of datasets.

DETAILED DESCRIPTION

Figure 1A:
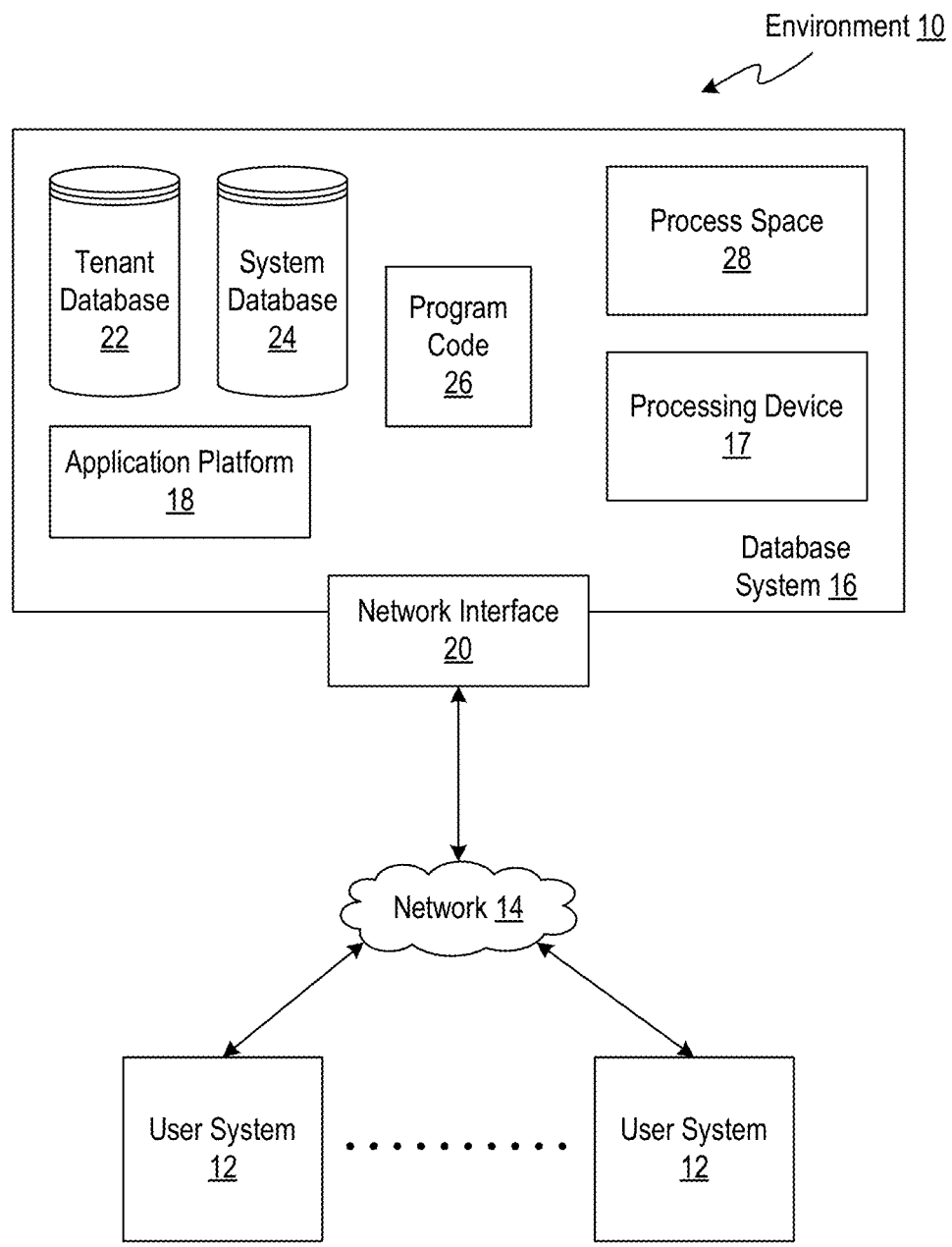
FIG. 1A illustrates a block diagram of an example computing environment in which an on-demand database service can be used according to some implementations.

Various embodiments provide a manner of suggesting datasets that are viable join candidates with a reference dataset based on an estimated level of independence between the reference dataset and other datasets. A suggestion of whether to join datasets can be based on dependence or independence of entries in the datasets. Various embodiments need not actually join the datasets to determine dependence or independence. For example, an approximation of whether an entry in the first dataset appears in a same row as an entry in the second dataset can be based on a grouping of multiple entries, where the grouping of multiple entries are present in first and second datasets. The grouping of multiple entries can be present in a column identified as a join key. For example, a column identified as a join key can have unique values and no null values (similar to a primary key in relational dataset table). A likelihood that a dataset is joinable with another dataset can be based, at least in part, on the approximation. Join candidate datasets can be identified based on a lower level of independence (e.g., higher levels of dependence). If more than a threshold number of entries in a join key (e.g., column) of multiple datasets match, the associated datasets are presented as candidates to join. In some embodiments, to reduce an amount of time that a user has to wait before receiving suggestion of dataset join candidates, a level of independence between datasets can be pre-calculated and used to identify datasets as join candidates to a user.

In some embodiments, at least some of the values relevant to determining the level of independence can be stored and used to provide seemingly immediate dataset candidates to join with a particular dataset. For example, pre-calculation can be performed for values $O_{ik}$, $O_k$, $P_i$ (or $O_i$), where i and k are entries in two columns in the same dataset, O is an occurrence of i and k in the same row in the same dataset, and P is probability of entry i occurring. To estimate the independence of two datasets, pre-calculation of occurrence O and probability P can be performed for the user's datasets. The values can be stored and available for use later. The pre-calculated values can be encrypted and stored in a secure region of memory or storage. Later, when a user is trying to perform joins with data management software tools, join suggestions can be made using the pre-calculated values. Accordingly, the time to identify one or more join candidates can be reduced, thereby allowing a user to select more datasets to join in a lesser amount of time than if calculations related to identifying join candidates were made after a user selects datasets to evaluate for joinability. Note that after datasets are joined, additional suggestions of join candidates can be made so that the joined dataset can be joined with another dataset.

Various embodiments provide for accessing a first dataset that includes at least one column identifier and associated entries and for each join candidate dataset, performing: determining a join key column identifier of the first dataset corresponding to a column identifier of the join candidate dataset; determining a level of independence between the first dataset and the join candidate dataset based at least, in part, on (i) an occurrence of a combination of an entry from the first dataset with multiple entries associated with the join key column identifier and (ii) an occurrence of a combination of an entry from the join candidate dataset with multiple entries associated with the column identifier of the join candidate dataset corresponding to the join key identifier; and recommending at least one dataset candidate to join with the first dataset based on the determined level of independence between the first dataset and each of the plurality of datasets.

FIG. 1A illustrates a block diagram of an example of an environment 10 in which an on-demand database service can be used in accordance with some implementations. Environment 10 includes user systems 12, a network 14, a database system 16 (also referred to herein as a "cloud-based system"), a processing device 17, an application platform 18, a network interface 20, a tenant database 22 for storing tenant data, a system database 24 for storing system data, program code 26 for implementing various functions of the database system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, environment 10 is a computing environment in which an on-demand database service exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

In some multi-tenant database systems, tenants may be allowed to create and store custom objects, or they may be allowed to customize standard entities or objects, for example by creating custom fields for standard objects, including custom index fields. In certain implementations, for example, all data records of a custom data object are stored in a single multi-tenant physical table, which may contain multiple logical database objects per organization. It is transparent to customers of the system 16 that their multiple database objects are in fact stored in one large table or that their data may be stored in the same table as the data of other customers, but subject to privacy and data security safeguards.

Application platform 18 can be a framework that allows the applications of the database system 16 to execute, such as the hardware or software infrastructure of the database system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a workstation, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input and output devices, such as a keyboard, a mouse, a trackball, a touch pad, a touch screen, a pen or stylus, or the like, for interacting with a graphical user interface (GUI) provided by the browser on a display (for example, a monitor screen, augmented reality (AR) overlay, virtual reality (VR) device, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as an Intel Core® processor or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications, and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known.

Figure 1B:
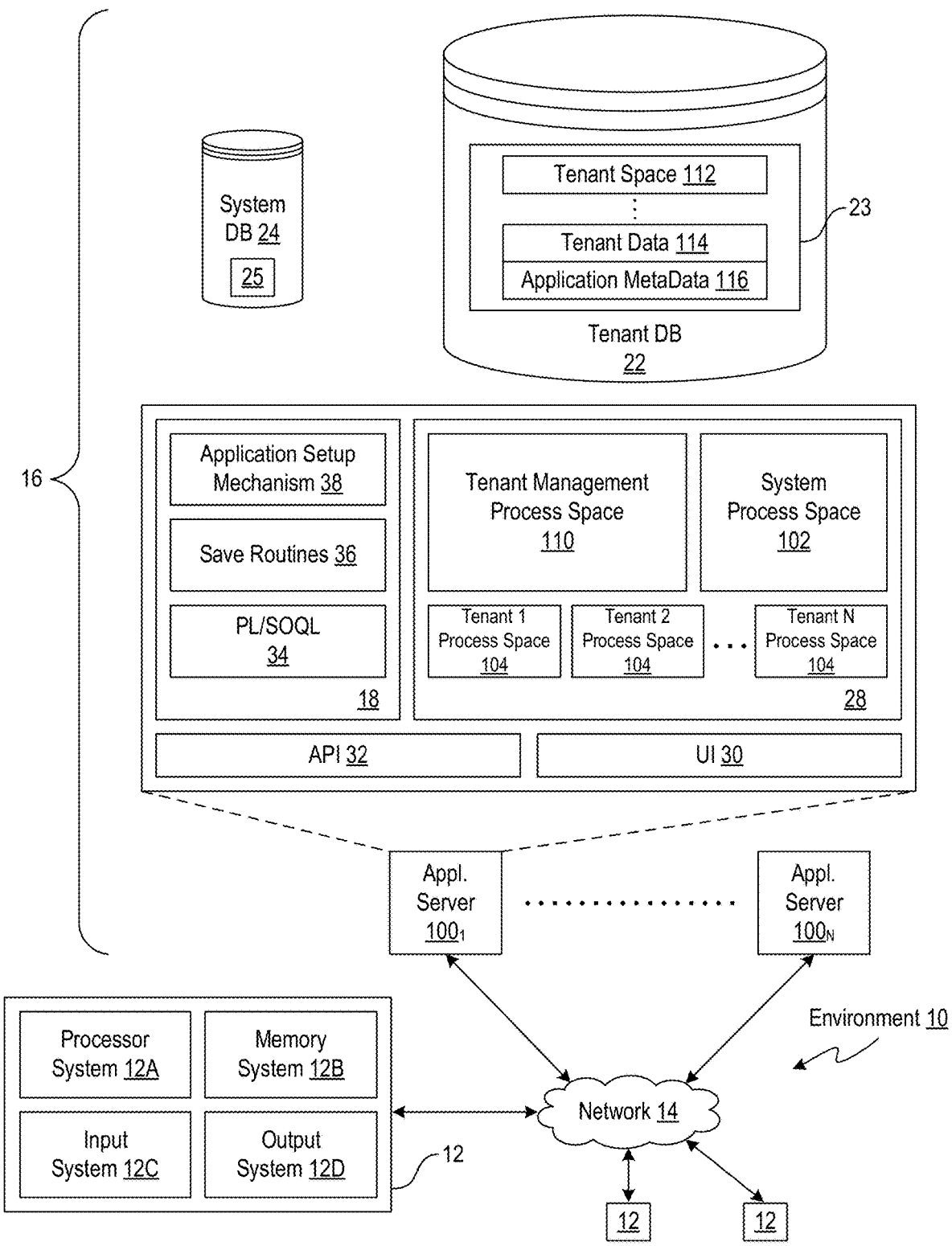
FIG. 1B illustrates a block diagram of example implementations of elements of FIG. 1A and example interconnections between these elements according to some implementations.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SOQL) 34, which provides a programming language style interface extension to the API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
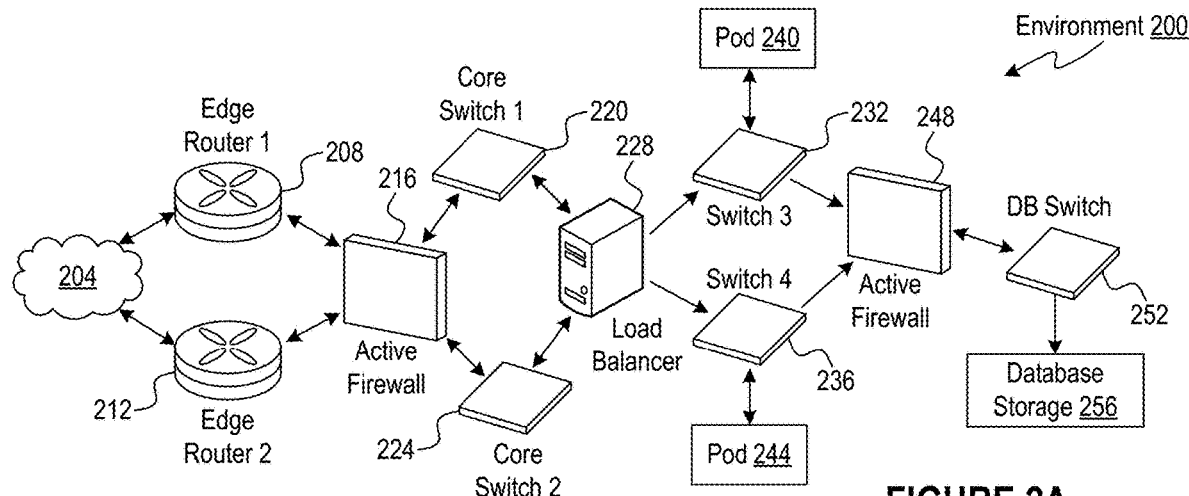
FIG. 2A illustrates a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
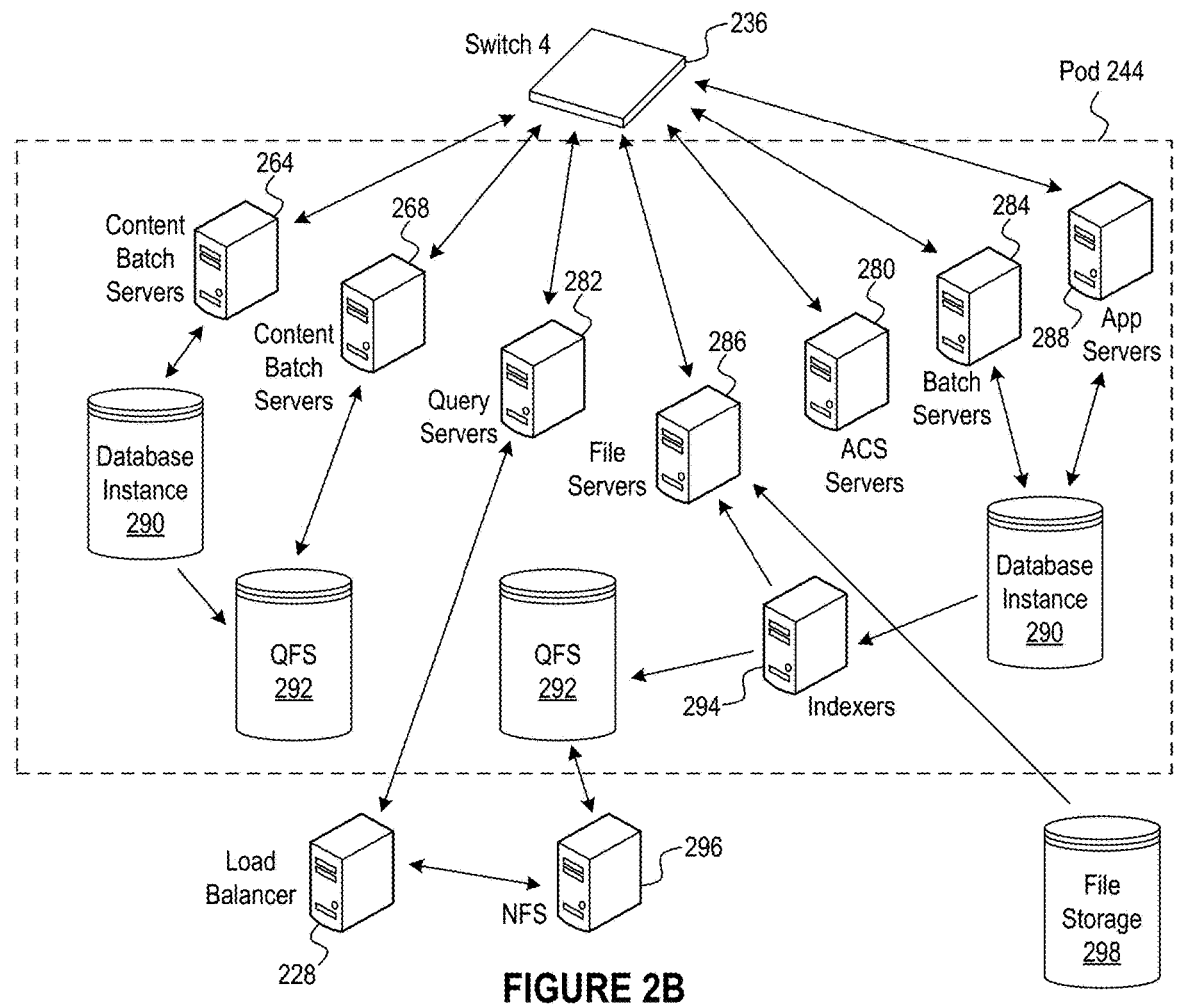
FIG. 2B illustrates a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multi-tenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems. Other types of file systems can be used.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292.

Figure 3:
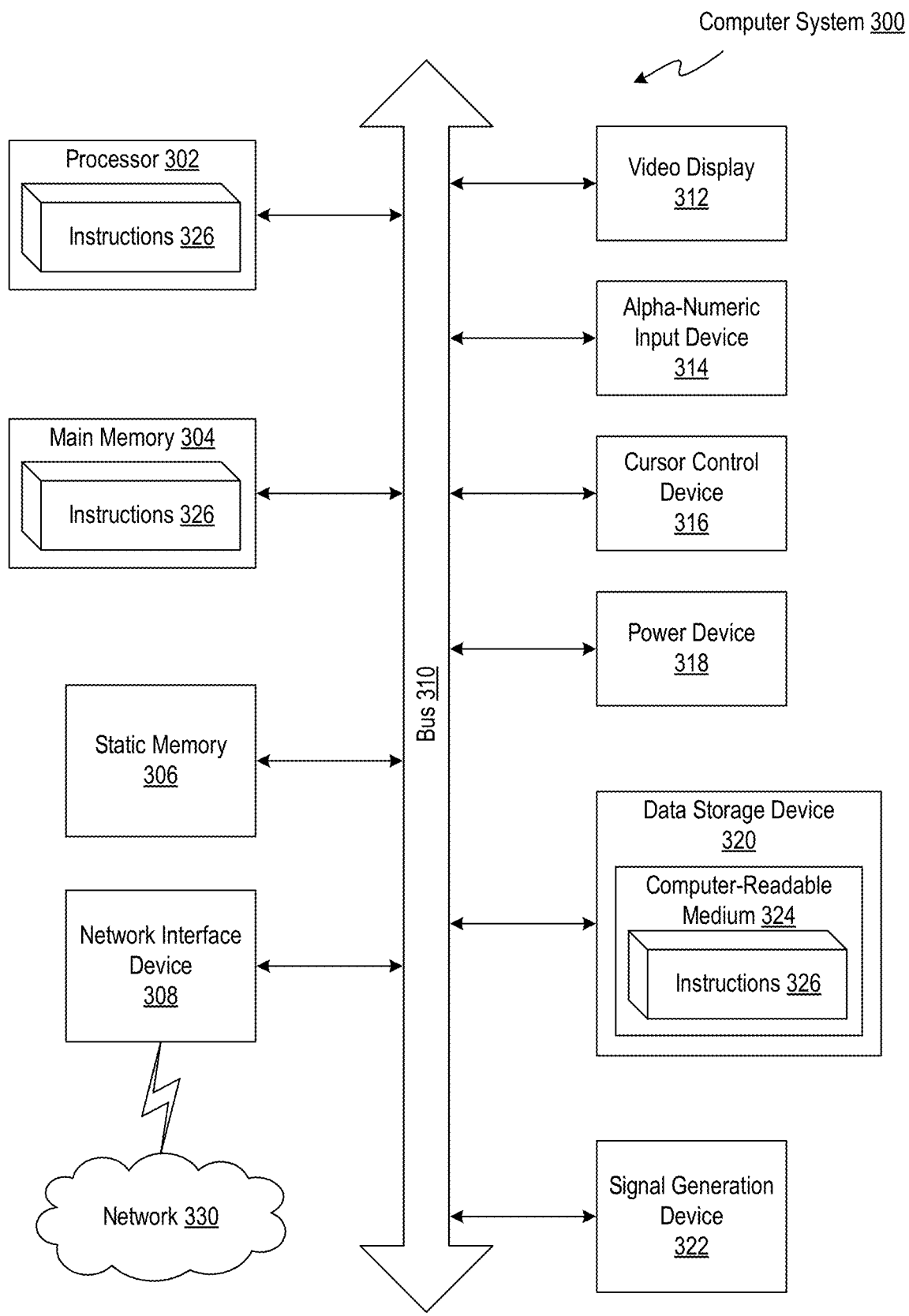
FIG. 3 illustrates a diagrammatic representation of a machine in the exemplary form of a computer system within which one or more implementations may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores. Reference to a computer processor can include any one or a combination of: a CPU, a core, ASIC, FPGA, DSP, network processor, graphics processing unit (GPU), general purpose graphics processing unit (GPGPU), and so forth.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loudspeaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

When a user is trying to build a data model, one important step is joining datasets. Joining the datasets with smaller amount of data and full knowledge about the data structure would make the decision easier. However, having full knowledge about the data structure is very time consuming. Current data preparation tools offer users a list of datasets they have and allows users to attempt to join datasets by selecting datasets to join. Specifically, a name or icon of a dataset can be selected for joining. When a user selects datasets to join, the user has to wait for a preview result (e.g., datasets after actual joining) to be calculated, decide if the join looks acceptable or not, and repeat the process for each join candidate dataset. When the number of datasets, and the number of fields in the datasets is large, selecting join candidates can take a large amount of time and discourage a user from selecting join candidates.

Many matches between datasets can be found. A brute force solution is to perform joining of all entries on the backend and then determine if the join leads to a dataset being supplemented with additional data or the datasets are divergent and are not good join candidates. However, the brute force solution requires a lot of computational resources and is not practical as it can take more time than the user is willing to accept.

Figure 4:
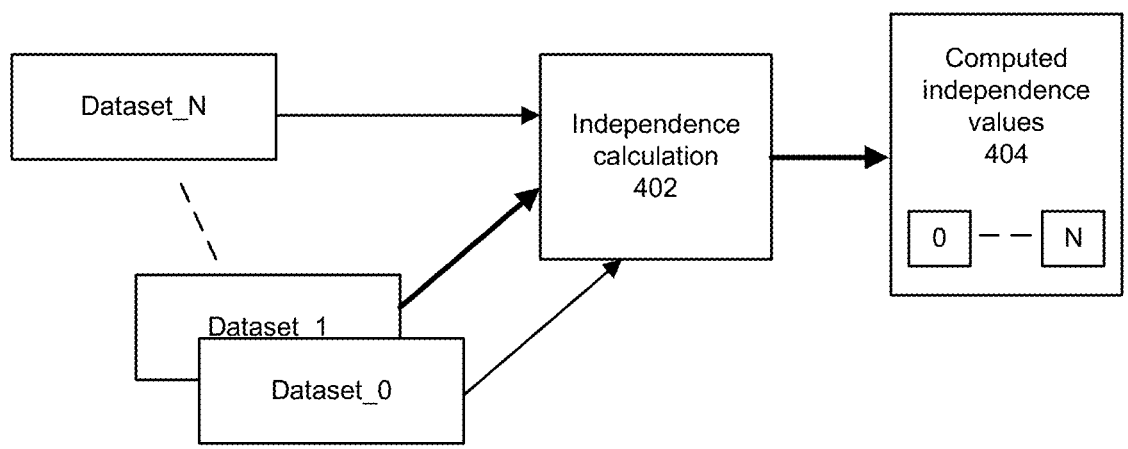
FIG. 4 depicts a high level example of a system that can determine likelihood of independence of datasets in accordance with some embodiments.

FIG. 4 depicts a high level example of a data management system that can determine likelihood of independence of datasets in accordance with some embodiments. Users can bring data into a data management system by uploading files, receiving data from Salesforce or external sources. The data management system stores the data. For example, the data management system can provide applications that analyze data to uncover insights, allows application of custom analytics, provides explanations for the patterns it identifies, offers guided recommendations on how to take action, helps CRM users communicate findings quickly with auto-generated slide presentations that contain visualizations and talking points.

In this example, a user has access to dataset 0 to dataset N. In this example, dataset 1 is a reference dataset and other datasets are available to evaluate as candidates for joining with dataset 1 among other uses. Independence calculation engine 402 can determine a level of dependence (relatedness or overlap) or independence between datasets. For example, techniques described herein can be used to approximate an occurrence of entry combinations arising in different datasets. Approximations of occurrences of entry combinations can be made by combining groups of entries and determining if a combination of an entry from a first dataset with a group of entries from the first dataset occurs in a same row as a combination of an entry from a second dataset with the group of entries in the second dataset. Based on the approximations of occurrences of entry combinations, a G-test can be performed to determine dependence between datasets. A G-test can be based on occurrence and probability values in manners described herein.

In some cases, occurrence and probability values can be pre-stored and available prior to a recommendation. In some cases, occurrence and probability values can be calculated at a time when a user requests an application or service to identify a dataset join candidate or evaluate joinability of a particular join candidate. Recommendations of dataset join candidates can be made based on likelihood of dependence with a particular dataset. Computed independence values 404 can represent stored a level of independence between datasets and identifiers of datasets that are likely join candidates for a dataset 0 to N.

Figure 5:
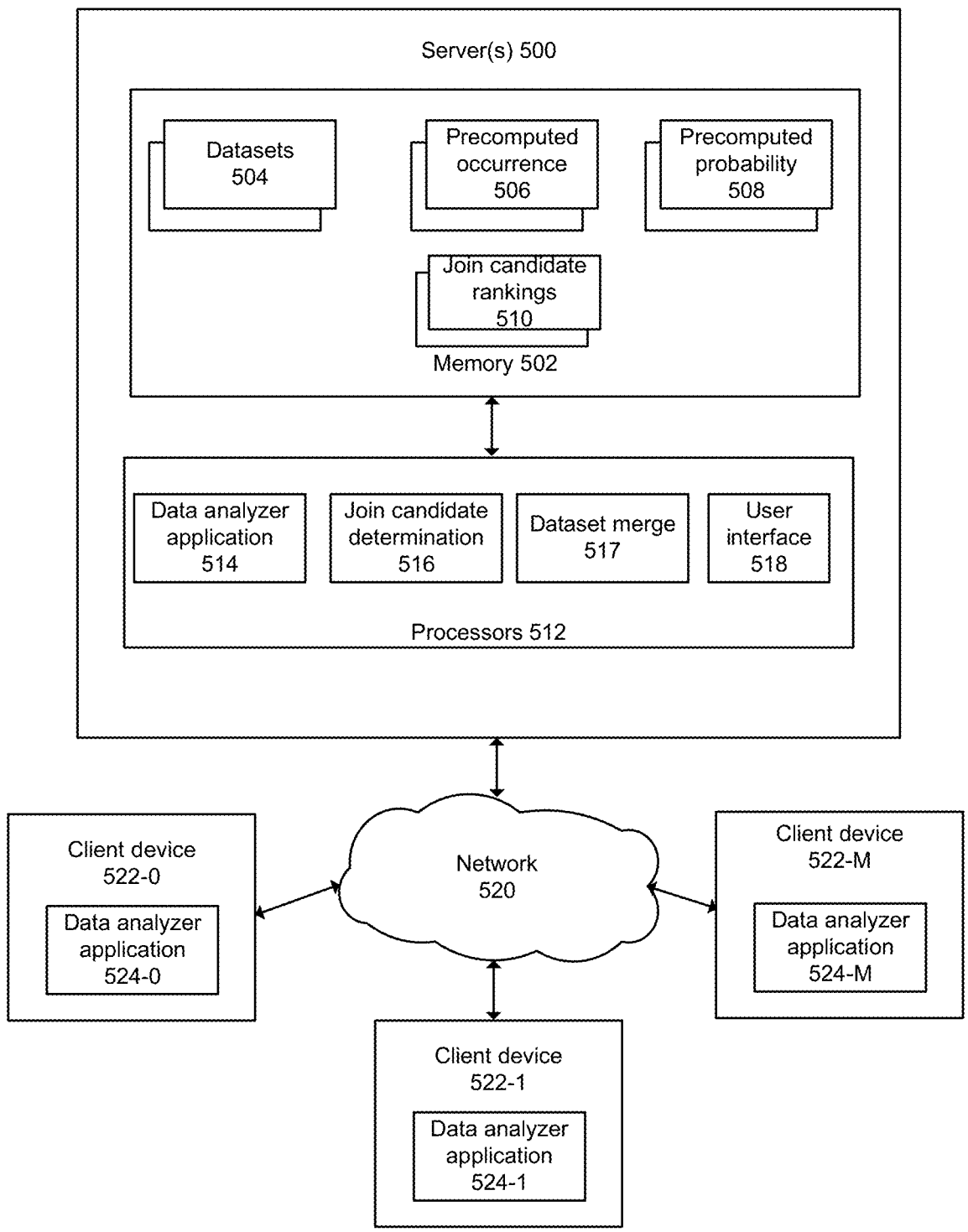
FIG. 5 depicts a system that can be used to perform an estimation of independence based on entry groupings.

FIG. 5 depicts a system that can be used to perform an estimation of independence based on entry groupings. For example, one or more server(s) 500 can be used as the back-end to provide computation, data analysis, and/or data storage. Hardware and software elements from other computing systems can be used in the system of FIG. 5. Server 500 can include at least memory 502 (e.g., volatile or non-volatile, including storage class memory (SCM)) and processors 512. Memory 502 can store one or more datasets 504. Datasets 504 can include one or more of the user's files or spreadsheets or other format that include at least data, email addresses, phone numbers, personal information, contact-dates, characters, numbers, hyperlinks, graphics, video, or other information. Precomputed occurrence values 506 can be occurrence values associated with entries in one or more datasets and can be determined in accordance with techniques described herein. Precomputed probability values 508 can be probability values associated with entries in one or more datasets and can be determined in accordance with techniques described herein. For example, if there are datasets 0-3 and datasets 1 and 3 are suitable join candidates for dataset 0, then datasets 1 and 3 can be identified as suitable join candidates for dataset 0 in join candidate rankings 510. Similar information can be stored for datasets 1-3, if there are any suitable join candidates.

Processors 512 can execute data analyzer application 514 in order to determine occurrence and probability values for entries in a dataset. In some embodiments, data analyzer application 514 can identify a join key column that is common to multiple datasets and determine entries in the join key column to group together to form multiple groups of entries. Data analyzer application 514 identifies multiple groups of entries and considers the groups in determining occurrence values for entries in a dataset and determining probability values for entries in a dataset, at least in accordance with manners described herein. Occurrence values and probability values can be stored in respective precomputed occurrence values 506 and precomputed probability values 508.

Processors 512 can execute join candidate determination 516 to determine a ranking of dataset join candidates. A G-test and/or chi squared distribution can be used to represent datasets that are likely to be suitable join candidates for a particular dataset. Determined join candidates can be stored in join candidate rankings 510.

Processors 512 can execute dataset merge 517 to perform joining of selected datasets to form a composite dataset in response to a request received from a user. Dataset merge 517 can merge entries from one or multiple rows from different datasets to form a composite dataset. For example, a first dataset includes columns 1 and 2 and a second dataset includes columns 2 and 3, where each column includes entries and column 2 is a join key column. Dataset merge 517 can join the first dataset with the second dataset by forming a composite dataset with rows of entries from columns 1, 2, and 3. For example, if dataset merge 517 determines that a row includes entries X and Y in respective columns 1 and 2 and Y and [empty] in respective columns 2 and 3, then dataset merge 517 can form a row with entries X, Y, and [empty] in respective columns 1, 2, and 3. For example, if dataset merge 517 determines that a row includes entries X and Y in respective columns 1 and 2 and entries Y and Z in respective columns 2 and 3, then join dataset merge 517 can form a row with entries X, Y, and Z in respective columns 1, 2, and 3.

In some examples, a composite dataset can be a dataset that has the same number of columns as the joined dataset. For example, if a first dataset includes columns 1 and 2 and a second dataset includes columns 1 and 2, the first and second datasets can be merged to form a two column composite dataset.

If joining datasets yields inconsistent rows in a composite dataset, dataset merge 517 can provide inconsistent rows. For example, a row0 includes entries M and N in respective columns 1 and 2 of a first dataset and entries N and F in respective columns 2 and 3 of a second dataset. But a row100 includes entries M and N in respective columns 1 and 2 and entries N and Z in respective columns 2 and 3 of the second dataset. In this example, dataset merge 517 can create a composite dataset with a row with entries M, N, F and another row with entries M, N, and Z. Dataset merge 517 can store a composite dataset into memory as represented by datasets 504. In some embodiments, dataset merge 517 can highlight or mark inconsistent rows to a user using for example, a highlighted color or other marker, and the user can decide which row or rows to keep or delete.

Processors 512 can execute user interface 518 to identify any join candidates for a dataset by causing the candidates to be displayed or presented by a user's device. A user can select datasets to join or evaluate as join candidates by interaction with the user interface. In addition, user interface 518 can display any composite dataset formed from two or more datasets.

Server(s) 500 can communicate with any of client devices 522-0 to 522-M using network 520. For example, server(s) 500 can transmit a user interface or data through network 520 to client devices 522-0 to 522-M. Server(s) 500 can receive commands from any of client devices 522-0 to 522-M using network 520. For example, commands can include selection of a dataset, request for display or presentation of join candidates, joining of datasets, among other commands. Authentication and secure connections can be used between server(s) 500 and any of client devices 522-0 to 522-M.

Client devices 522-0 to 522-M can execute data analyzer applications 524-0 to 524-M. Data analyzer applications 524-0 to 524-M can provide a client interface for analyzing, accessing, or modifying datasets that are stored remotely from client devices or stored local to a client device and backed up remotely in server(s) 500. A client device can be any of a smartphone, tablet, virtual reality headset, augment reality device, personal computer, smart speaker, or other device.

Note that any embodiments described herein can be implemented as any or a combination of software executed by a computer processor or a fixed function device such as an ASIC or FPGA.

Figure 6:
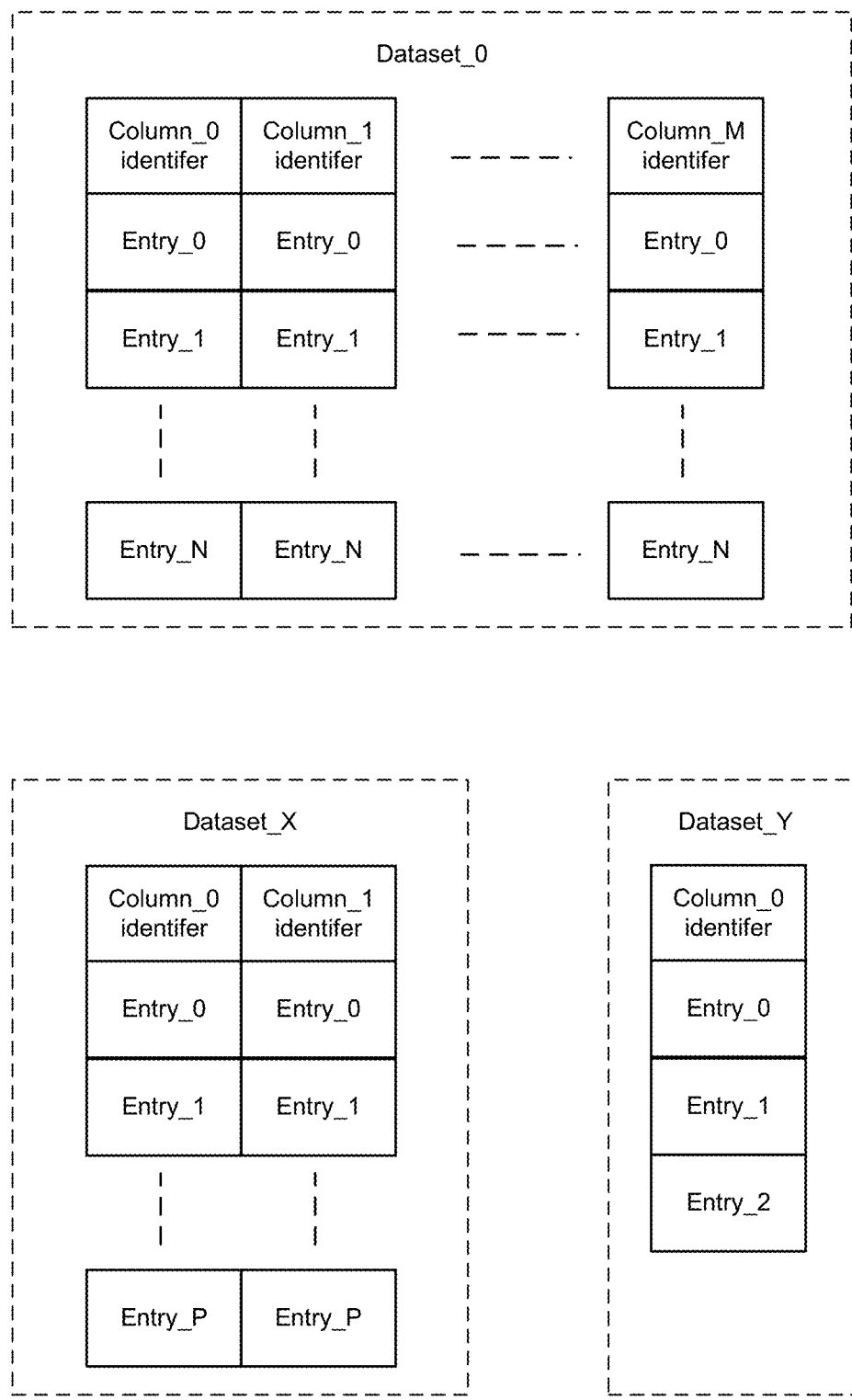
FIG. 6 depicts an example of a format of datasets.

FIG. 6 depicts an example of a format of datasets. For example, datasets can have any number of columns and rows, from 1 row and 1 column (1×1) to any number of rows and columns. Dataset_0 shows a N row by M column dataset with column identifiers for each of the columns. Dataset_X shows a P row by 2 column dataset with column identifiers for each of the columns. Dataset_Y shows a 3 row by 1 column dataset with column identifiers for each of the columns. Entries in each dataset can be customer's data can include any types of information such as characters, numbers, dates, strings, alpha-numeric combinations, symbols, hyperlinks, images, and videos. For example, a dataset can be provided in any file or data format including at least one or more of: Salesforce applications, comma-separated values (CSV) file, Hadoop, MySQL, Netezza, Oracle applications, PostgreSQL, SAP, or SQL server.

Next, an example description of a manner of determining occurrences and expectations for a dataset is provided. In this example, a dataset has 2 columns. Column 1 has two entries, namely A and B, and column 2 has two entries, namely C and D.

Dataset Example:

```
1  2
A  C
B  D
```

An occurrence of AC, $O_{AC}$, represents a count of a number of times AC occurs in a same row in a dataset. In this example, $O_{AC}=1$. Similarly, occurrences, $O_{AB}$, $O_{AD}$, $O_{BC}$, $O_{BD}$, and $O_{CD}$ represent occurrences of respective AB, AD, BC, BD, and CD in the same row. For example, $O_{AB}=0$ and $O_{AD}=0$ whereas $O_{BD}=1$.

A probability of A occurring in a dataset, $P_A$, is an indication of how many times A happens in the dataset, divided total number of rows in dataset (e.g., 2). Similarly, probability of C occurring in a dataset, $P_C$, is an indication of how many times C happens in the dataset, divided total number of rows in dataset (e.g., 2). Similar probability determinations are made for B and D.

For this example dataset, a calculation is made of an expectation of entries occurring in the same row in a joined dataset, namely, expectations of AC occurring in the same row, BD occurring in the same row, AB occurring in the same row, and CD occurring in the same row. The following equations can be used to determine expectation, $E_{ij}$, where i and j are entries in the dataset.

$E_{AC}=P_A*P_C*$number of rows in a joined data set, $E_{BD}=P_B*P_D*$number of rows in any joined data set, $E_{AB}=P_A*P_D*$number of rows in any joined data set, and $E_{CD}=P_C*P_D*$number of rows in any joined data set.

In this example, a number of rows in a joined dataset can be a smaller number of dataset rows of a join candidate.

In the example above, the expectation, $E_{AC}$, is that A and C will be in the same row for 50% of time (0.5*0.5*2). The expectation, $E_{BD}$, is that B and D will be in the same row is 50% of time (0.5*0.5*2).

Next discussion turns to an example manner of determining independence of datasets. A G-test can be used for determining a level of independence or dependence between datasets. When performing a G-test for two fields in the same dataset, the following formula can be used:

$G=2*\text{sum}(O_{ij}*\ln(O_{ij}/E_{ij}))$, where i refers to an entry in a column, j refers to entry in another column, and ln=log base e.

When fields belong to two datasets, $E_{ij}$ can be calculated. However, $O_{ij}$ is the real occurrence fields i and j occur in the joined dataset. To observe $O_{ij}$, a real join of datasets needs to be performed to determine expectation that fields i and j are in a same row by counting times i and j are in same row. Such counting task can be time consuming and introduce unacceptable delay to a user.

For a perfect join, the join key column $C_k$ is unique. A join key can be an arbitrary column identifier in two datasets where the column identifier in the dataset has entries that are found in a column in the other dataset and vice versa. Because the join key C is unique, $O_k=1$, which is equivalent to the $O_{ij}$ observation after the join is performed.

A probability of entries X and Y occurring in the same row is determined from: $P(XY)=P(X)*P(Y|X)=P(Y)*P(X|Y)$, where X|Y represents X based on Y. For multiple datasets, the formula for P(XY) can be represented as:

$$P(X_iY_j) = \text{sum}(P(X_i) * P(C_k \mid X_i) * P(Y_j \mid C_k))$$
$$= P(X_i) * (O_{ik}/O_i) * (O_{jk}/O_k)$$
$$= P(X_i) * (O_{ik}/P(X_i)/N) * (O_{jk}/P(C_k)/N)$$
$$= O_{ik} * O_{jk}/(P(C_k) * N^2).$$

where:

k group represents one or more entries in a join key, $O_{ik}$=occurrence of entry in i and k groups (e.g., datasets) in same row, and $O_{jk}$=occurrence of entry in j and k groups (e.g., datasets) in same row.

According to some embodiments, pre-calculation can be performed for ($O_{ik}$, $O_{jk}$, $O_k$, $P_i$ (or $O_i$), $P_j$ or ($O_j$)) for a dataset to make them available for determining independence of datasets. Pre-calculated values can be stored and available to use to determine independence of datasets and suggest datasets to join. Referring to the dataset example above, pre-calculation can be performed for one or more of: occurrences $O_{AB}$, $O_{AD}$, $O_{BC}$, $O_{BD}$, and $O_{CD}$, $P_A$ (or $O_A$), $P_B$ (or $O_B$), $P_C$ (or $O_C$), and $P_D$ (or $O_D$), and number of rows in a dataset.

Repeating an earlier observation, to determine $O_{ij}$, a real join of datasets needs to be performed to determine expectation that fields i and j are in a same row by counting times i and j are in same row. Such counting task can be time consuming and introduce unacceptable delay. Various embodiments assume a join is a perfect join and determine probability of entries occurring in same row based on a grouping or bucket of two or entries in a join key column. For example, a determination of whether a first entry occurs in a same row as second, third, fourth, or fifth entries can be approximated by binning second and third entries and binning fourth and fifth entries and determining if the first value occurs in the same row as second or third entries and determining if the first value occurs in the same row as fourth or fifth entries. At least two bins or buckets in a join key column can be formed and a bin or bucket can include two or more entries.

Next, an example of a manner of determining join candidates will be described with respect to datasets in FIGS. 7 and 8. FIG. 7 depicts an example of a first dataset and FIG. 8 depicts an example of a second dataset. Note that the examples provided are simplified with 2 columns and 2 rows. Embodiments are not limited in this regard as evaluation can occur independent of sizes of datasets, where datasets can have any number of columns and rows. In this example, dataset 700 includes entries under column identifier "Name" and "Phone Number." The entries under column identifier "Name" are Arthur Bird and Bird Caller. Entries under column identifier "Phone Number" are phone numbers 123-321-1242, 401.131.9684, 501-247-6247, and 216 431 7800. For abbreviation, as shown in FIG. 7, Arthur Bird will be referred to as entry A and Bird Caller will be referred to as entry B and phone numbers 123-321-1242, 401.131.9684, 501-247-6247, and 216 431 7800 will be referred to as respective abbreviated entries 1, 2, 3, and 4.

FIG. 8 depicts a second dataset that includes entries under column identifier "Phone Number" and "Email." The entries under column identifier "Phone Number" are phone numbers 123-321-1242, 401.131.9684, 501-247-6247, and 216 431 7800 and correspond to respective abbreviated entries 1, 2, 3, and 4. Entries under column identifier "Email" are arty@mail.com, mrbird@email.net, arty@mail.com, and mrbird@email.net. For ease of illustration, as shown in FIG. 8, entries arty@mail.com, mrbird@email.net, arty@mail.com, and mrbird@email.net are abbreviated as respective C, D, C, and D.

Column Phone Number is common to the first and second datasets and can be selected as a join key column. For a join key column of Phone Number, to determine an actual probability that a particular Name "Arthur Bird" (represented as "A") and Email "arty@mail.com" (represented as "C") occur in the same row, the following calculation can be used:

$P(AC)$=sum of $O(A1)*O(1C)/(P(1)*N^2)=1*1/(0.25*4*4)=0.25$ $O(A2)*O(2C)/(P(2)*N^2)=1*0/(0.25*4*4)=0$ $O(A3)*O(3C)/(P(3)*N^2)=1*1/(0.25*4*4)=0.25$ $O(A4)*O(4C)/(P(4)*N^2)=0*0/(0.25*4*4)=0.$ The resulting sum is 0.5. Accordingly, based on this example, a probability that Arthur Bird and Email arty@mail.com occur in the same row is 0.5. Note that for this example, P(AD), P(BC), and P(BD) can also be calculated to determine a probability of occurrence in the same row of respective Arthur Bird and mrbird@email.net, Bird Caller and arty@mail.com, and Bird Caller and mrbird@email.net.

However, to determine a probability that entries occur in the same row, occurrences of entry combinations are determined from an actual join. As stated earlier, this can be computationally intensive and introduce a large amount of time and delay before join candidate recommendations are available to a user. According to various embodiments, groupings of entries can be formed to reduce a number of calculations. In the examples of FIGS. 7 and 8, entries in the join key column can be combined to form a group or bucket. For example, for the join column of Phone Number, entries 123-321-1242 and 401.131.9684 can be a group of 1-2 and entries 501-247-6247 and 216 431 7800 can be a group of 3-4. Occurrences can be determined for Arthur Bird with Phone Number group 1-2 and Arthur Bird with Phone Number group 3-4. Accordingly, the following calculations can be performed to determine P(AC)=sum of:

$O(A1-2)*O(1-2C)/(P(1-2)*N*N)=2*1/(0.5*4*4)$ and $O(A3-4)*O(3-4C)/(P(3-4)*N*N)=1*1/(0.5*4*4).$ A determined approximation of P(AC) based on the entry groupings is 0.375. Note that by comparison, the computed actual P(AC) is 0.5. To determine an approximation of P(AC), fewer calculations are performed, which can save time.

Additional calculations for a grouping of 1-2 and 3-4 can be used to determine P(AD), P(BC), and P(BD). For example, for P(AD), calculation can include determining a sum of:

$O(A1-2)*O(1-2D)/(P(1-2)*N*N)$ and $O(A3-4)*O(3-4D)/(P(3-4)*N*N).$

For example, for P(BC), calculation can include determining a sum of:

$O(B1-2)*O(1-2C)/(P(1-2)*N*N)$ and $O(B3-4)*O(3-4C)/(P(3-4)*N*N).$

One or more of the following can be stored: O(A1-2), O(A3-4), O(B1-2), O(B3-4), P(1-2), P(3-4), number of rows, and can be used to determine a level of independence between the dataset of FIG. 7 and another dataset. Likewise, one or more of O(1-2C), O(3-4C), O(1-2D), O(3-4D), P(1-2), P(3-4), and number of rows can be stored to determine a level of independence between the dataset of FIG. 8 and another dataset.

To apply a G-test, described above, considerations are made of occurrence and probabilities of A and C, A and D, B and C, and B and D in the same row. Occurrence can be calculated as probability times number of rows. $S_O$, $O_{AC}=P_{AC}*$number of rows and $O_{AD}=P_{AD}*$number of rows. And $E_{AC}=P_A*P_C*$number of rows in a joined data set. Similar calculations can be performed for AD, BC, and BD. A chi-squared distribution of G-test results can be used to determine likelihood of dependence of datasets.

FIG. 9 depicts an example dataset that results from a joining of the datasets of FIGS. 7 and 8.

Figure 10:
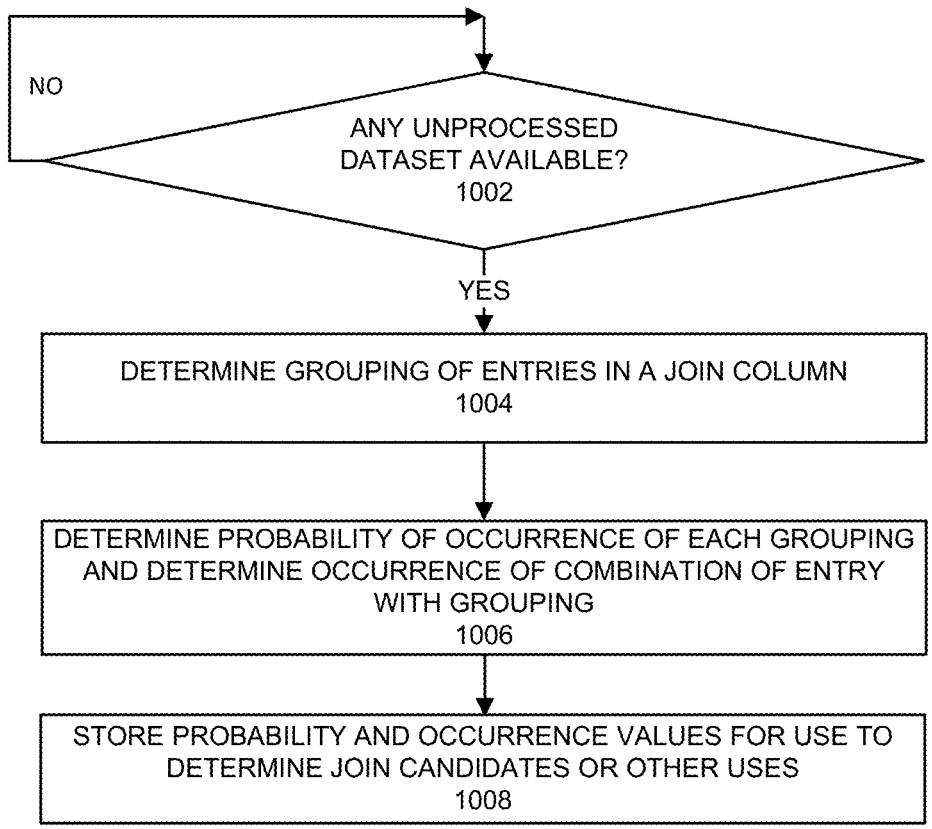
FIG. 10 depicts an example process that can be used.

FIG. 10 depicts an example process that can be used. At 1002, a determination is made if any datasets have not been processed to determine probability and occurrence values. If no dataset is to be processed, the process ends. If any dataset has not been processed, the process proceeds to 1004, where the process determines one or more groupings of entries in a column that is a join key candidate. A grouping can include 2 or more entries in a column and a column can have 2 or more groupings. A join key can be determined as a column having unique and non-recurring entries. The join key can be selected for a dataset irrespective of join keys in other datasets. At 1006, the process determines a probability of each of the groupings in the dataset and an occurrence of one or more combinations of each entry from another column in the dataset with each grouping. For example, a probability can be determined based on equations and relationships provided herein. Likewise, an occurrence of a combination of an entry from a column with a grouping from another column can be determined using equations and relationships described herein. At 1008, the process stores the probability of each of the groupings in the dataset and an occurrence of combinations of each entry in the dataset with each grouping. The stored probability and occurrence can be available for use later to evaluate dataset join candidates.

Figure 11:
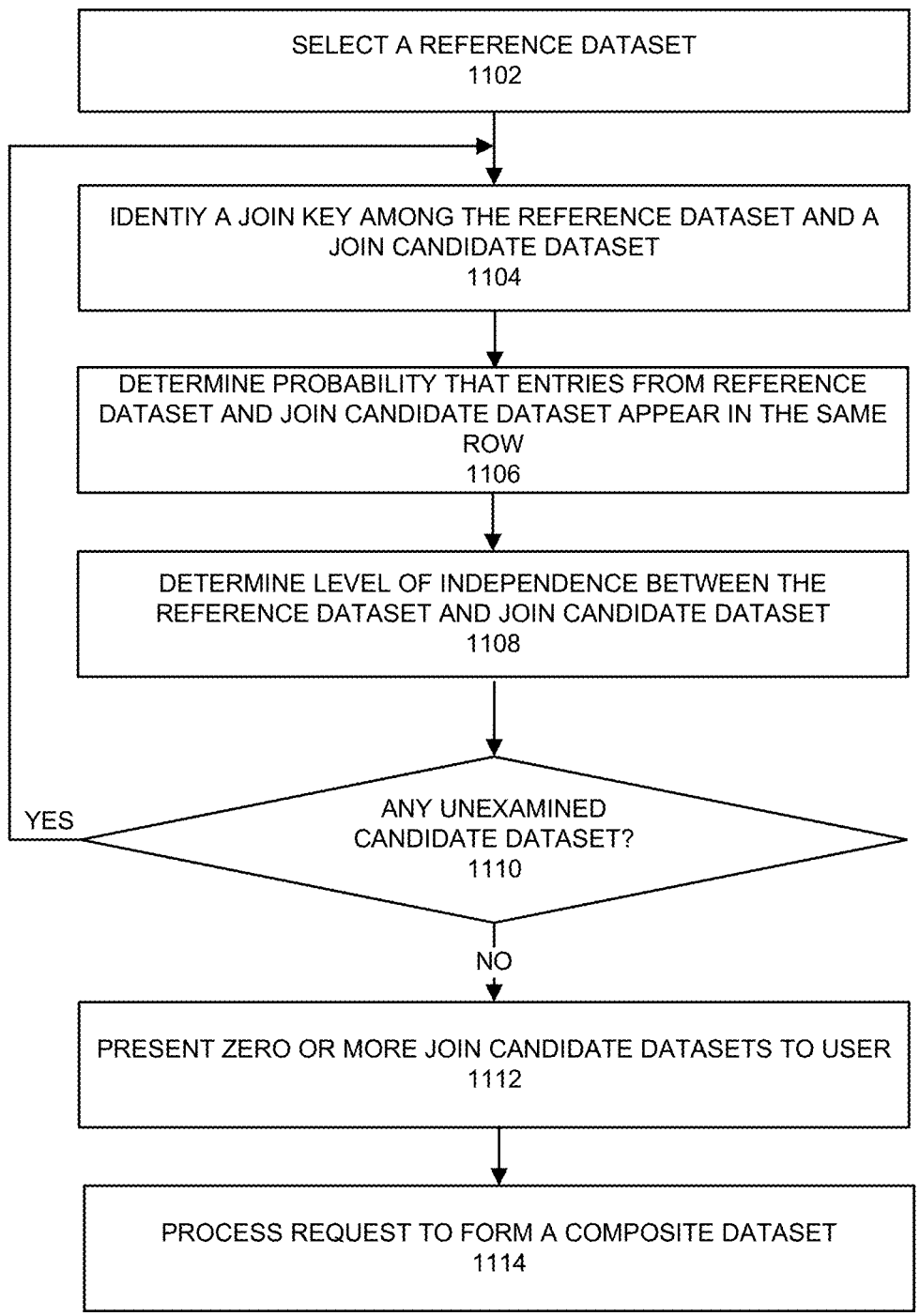
FIG. 11 depicts an example process that can be used.

FIG. 11 depicts an example process that can be used. At 1102, the process selects a reference dataset from among one or more of a user's datasets. For example, the reference dataset can be a dataset selected by a user. In some examples, the reference dataset can be a dataset determined to have a greatest number of other datasets as join candidates. At 1104, the process identifies a join key that is common to the reference dataset and candidate dataset. The join key can be a column of one or more entries. At 1106, the process determines a probability of appearance in the same row of one or more entries from a column in the reference dataset and entries from one or more columns in a different candidate dataset. Examples of manners of appearance in the same row of one or more entries from a column in the reference dataset and entries from one or more columns in a different candidate dataset are described herein. At 1108, the process determines a level of independence between the reference dataset and the candidate dataset based on the one or more probabilities determined in 1106. Example manners of determining dataset independence are described herein. At 1110, the process determines if any other candidate datasets other than the reference dataset have not been considered for a level of independence with the reference dataset. If any other candidate dataset has not been considered, the process returns to 1104 and determines a level of independence between the reference dataset and the candidate dataset. If all candidate datasets have been considered, the process continues to 1112. At 1112, the process determines a ranking of join candidate datasets to present to the user. The join candidate datasets can be ranked based on a probability of appearance in the same row of one or more entries from a column in the reference dataset and entries from one or more columns in a different candidate dataset. A G-test and chi-squared distribution can be used to rank candidate datasets as join candidates based on relatedness or dependence. The process can provide zero or more join candidate datasets for presentation to a user in a user interface based on the ranking.

At 1114, the process can process a received request to join datasets to form a composite dataset. For example, one or more processors can be used to merge entries from a dataset with entries from another dataset. Composite datasets can be formed with entries from multiple datasets. A join key column can be used as an overlap between datasets. Various techniques described herein to form a composite dataset can be used.

Figure 12:
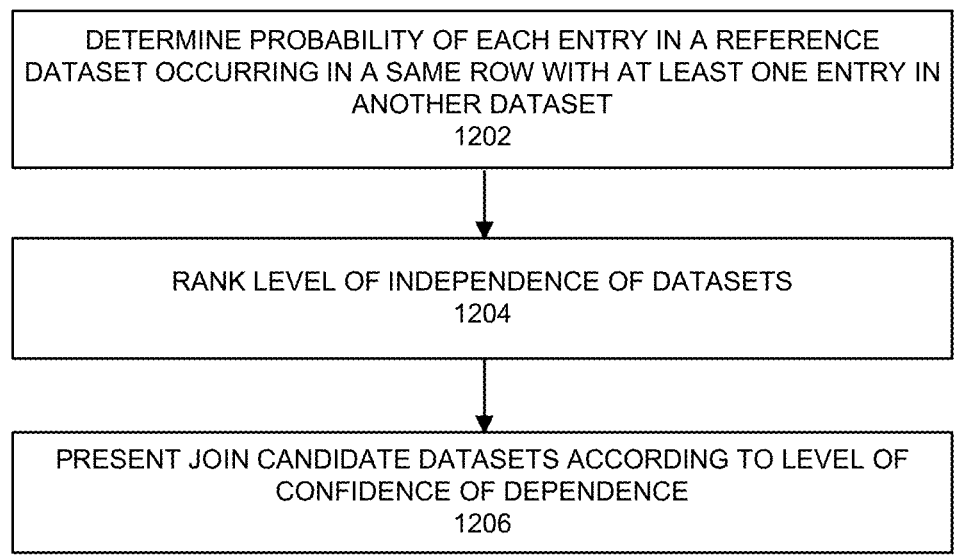
FIG. 12 depicts an example process to determine join candidates to present to a user.

FIG. 12 depicts an example process to determine join candidates to present to a user. At 1202, the process performs a determination of probability of each entry in at least one column in the reference dataset occurring in a same row as at least one entry in a column in another dataset. Relationships and equations described herein can be used to determine the probability of each entry in at least one column in the reference dataset occurring in a same row as an entry in a column in another dataset based on probability and occurrence values. In some examples, the probability and occurrence values can be pre-computed and available prior to performance of 1202. At 1204, the process performs a ranking of level of independence among datasets. For example, a G-test can be used as a test of independence or dependence between two datasets. After calculating a test score, a chi squared distribution can be used to rank a confidence level of a join candidate dataset. At 1206, the process can present join dataset candidates as ranked by confidence level to a user. For example, a user interface can be used to identify join candidate datasets.

Figure 13:
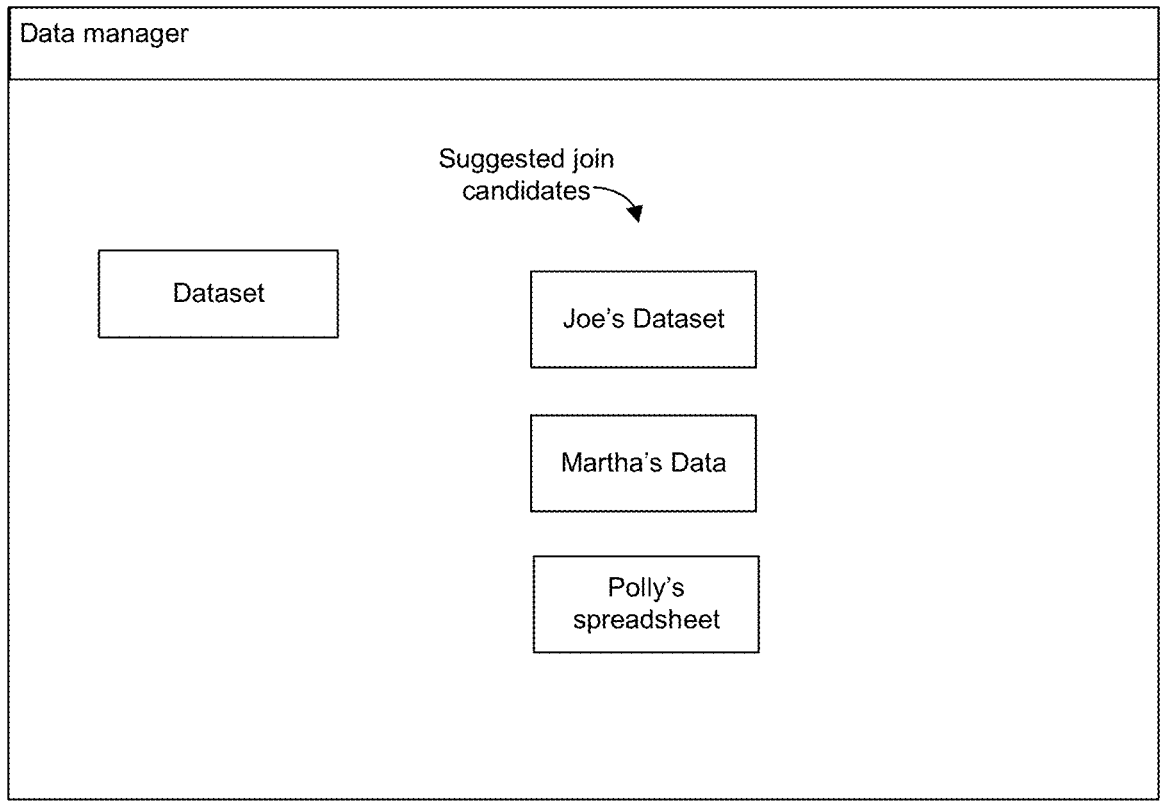
FIG. 13 depicts an example user interface that can be used.

FIG. 13 depicts an example user interface that can be used. An application window can identify a feature called Data manager. Within the window, a dataset is shown along with suggested join candidates. The join candidates can be identified from top to bottom in order of most likely to be related to the dataset to less likely to be related to the dataset provided that displayed join candidates exceed a threshold in likelihood of dependence or relatedness. The ranking of join candidate datasets can be made based on techniques described earlier using groupings of entries in a join key column.

Figure 14:
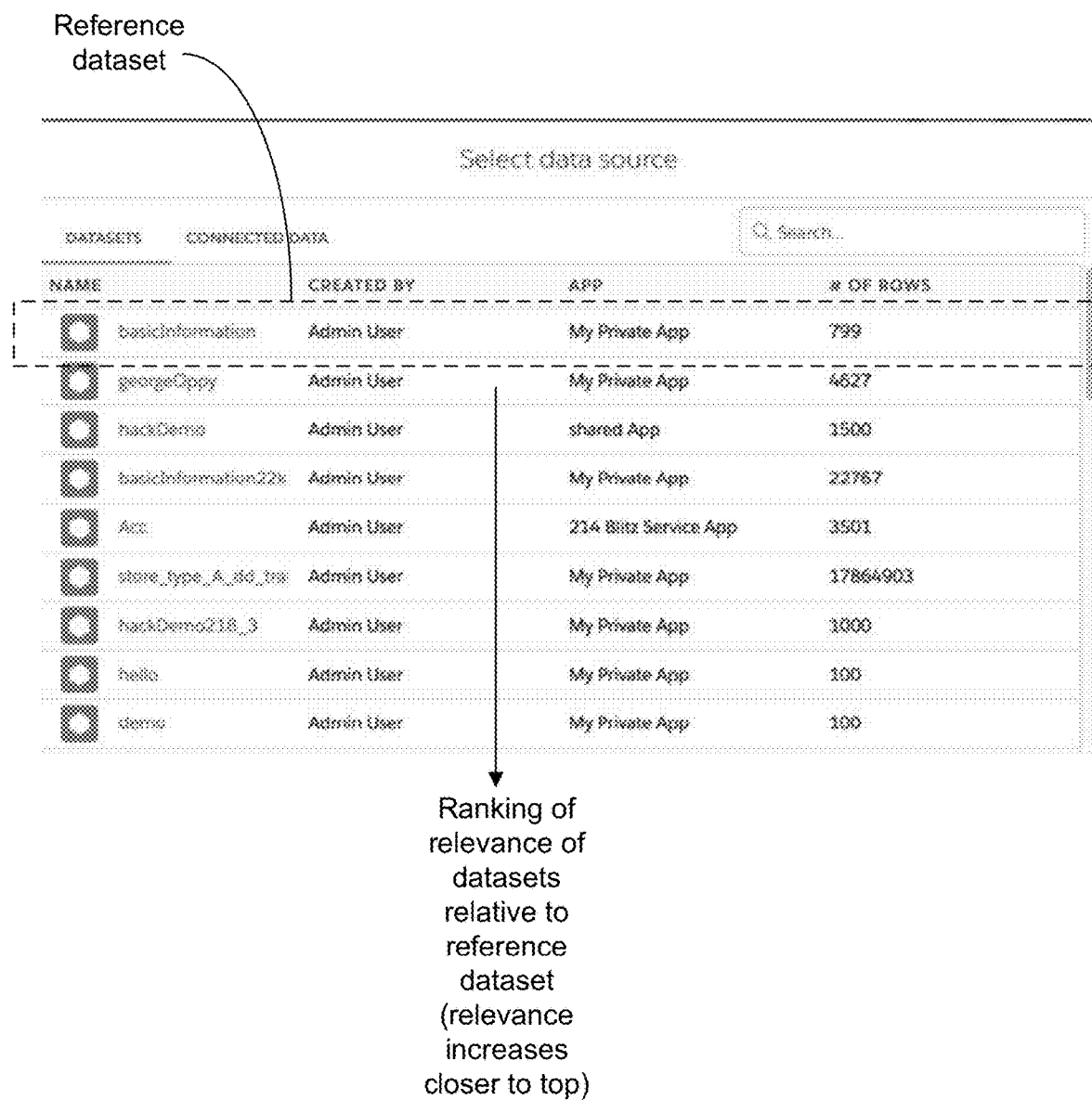
FIG. 14 depicts another example user interface.

FIG. 14 depicts another example user interface. In this example, a user is allowed to select a dataset to join with another dataset. A reference dataset is shown on top. Datasets beneath the reference dataset can be ranked (top to bottom) as suitable join candidates according to likelihood of dependence on the reference dataset. If another dataset is chosen besides the reference dataset, another dataset is shown at the top as the reference dataset and datasets beneath it are ranked (top to bottom) as suitable join candidates according to likelihood of dependence with the reference dataset.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," "some implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
accessing, using one or more computer processors, a first dataset from a memory device, the first dataset comprising at least one column identifier and associated entries;
accessing, using one or more computer processors, a dataset other than the first dataset, from a memory device, the accessed dataset other than the first dataset comprising at least one column identifier and associated entries, and for each accessed dataset other than the first dataset, performing:
identifying, using one or more computer processors, a join key column identifier of the first dataset corresponding to a column identifier of the accessed dataset;
determining, using one or more computer processors, a level of independence between the first dataset and the accessed dataset based at least, in part, on (i) an occurrence of a combination of an entry from the first dataset with multiple entries associated with the join key column identifier and (ii) an occurrence of a combination of an entry from the accessed dataset with multiple entries associated with the column identifier of the accessed dataset corresponding to the join key column identifier; and
recommending, using one or more computer processors, at least one dataset candidate to join with the first dataset based on the determined level of independence between the first dataset and the accessed dataset, the recommending comprising:
using one or more computer processors to cause display, in a remote graphical user interface, of a region displaying an identifier of the first dataset and at least one other join candidate dataset,
receiving an indication to join a selected dataset with the first dataset,
causing a formation of a composite dataset, using one or more computer processors, by joining the selected dataset with the first dataset, and
storing the composite dataset into a memory device.

2. The computer-implemented method of claim 1, comprising:
  determining, using one or more computer processors, the occurrence of a combination of an entry from the first dataset with multiple entries associated with the join key column identifier based, at least, in part on a number of occurrences of the combination of an entry from the first dataset with multiple entries associated with the join key column identifier and
  determining, using one or more computer processors, the occurrence of a combination of an entry from the accessed dataset with multiple entries associated with the column identifier of the accessed dataset corresponding to the join key column identifier based, at least, in part on a number of occurrences of a combination of an entry from the accessed dataset with multiple entries associated with the column identifier of the accessed dataset corresponding to the join key column identifier.

3. The computer-implemented method of claim 1, wherein entries associated with the join key column identifier include unique values and no null values.

4. The computer-implemented method of claim 1, wherein a format of a dataset is compatible with one or more of: Salesforce applications, comma-separated values (CSV) file, Hadoop, Structured Query Language (SQL) server, MySQL, Netezza, Oracle applications, or PostgreSQL.

5. The computer-implemented method of claim 1, comprising:
  applying a G-test of independence between the first dataset and each accessed dataset of accessed datasets other than the first dataset and
  applying a chi squared distribution to rank as join candidates of the accessed datasets other than the first dataset.

6. The computer-implemented method of claim 5, comprising:
  identifying join set candidates for the first dataset based on a pre-computed rank.

7. The computer-implemented method of claim 5, comprising:
  storing a pre-computed rank for use prior to recommending at least one dataset candidate to join with the first dataset.

8. The computer-implemented method of claim 1, wherein determining, using one or more computer processors, a level of independence between the first dataset and the accessed dataset based at least, in part, on (i) an occurrence of a combination of an entry from the first dataset with multiple entries associated with the join key column identifier and (ii) an occurrence of a combination of an entry from the accessed dataset with multiple entries associated with the column identifier of the accessed dataset corresponding to the join key column identifier, wherein the determining comprises determining at least:

$$P(AB)=O(\text{first grouping with } A)*O(\text{first grouping with } B)/(P(\text{first grouping})*N2)+O(\text{second grouping with } A)*O(\text{second grouping with } B)/(P(\text{second grouping})*N2),$$

wherein
P(AB) represents a probability of A and B, A and B are paired with a same grouping,
A represents the entry from the first dataset,
B represent the entry from the accessed dataset,
the first grouping is multiple entries associated with the join key column identifier,
the second grouping is multiple other entries associated with the join key column identifier,
O represents an occurrence, and
N2 represents a number of rows in the first dataset.

9. A data management system, comprising:
at least one processing device and
at least one memory coupled to the at least one processing device, the at least one memory having instructions stored thereon that, in response to execution by the at least one processing device, cause the at least one processing device to:
access, using one or more computer processors, a first dataset from a memory device, the first dataset comprising at least one column identifier and associated entries;
access, using one or more computer processors, a dataset other than the first dataset, from a memory device, the accessed dataset other than the first dataset comprising at least one column identifier and associated entries, and for each accessed dataset other than the first dataset, performing:
  identifying, using one or more computer processors, a join key column identifier of the first dataset corresponding to a column identifier of the accessed dataset;
  determining, using one or more computer processors, a level of independence between the first dataset and the accessed dataset based at least, in part, on (i) an occurrence of a combination of an entry from the first dataset with multiple entries associated with the join key column identifier and (ii) an occurrence of a combination of an entry from the accessed dataset with multiple entries associated with the column identifier of the accessed dataset corresponding to the join key column identifier; and
recommending, using one or more computer processors, at least one dataset candidate to join with the first dataset based on the determined level of independence between the first dataset and the accessed dataset, the recommending comprising:
  using one or more computer processors to cause display, in a remote graphical user interface, of a region displaying an identifier of the first dataset and at least one other join candidate dataset,
  receiving an indication to join a selected dataset with the first dataset,
  causing a formation of a composite dataset, using one or more computer processors, by joining the selected dataset with the first dataset, and
  storing the composite dataset into a memory device.

10. The data management system of claim 9, comprising the at least one memory coupled to the at least one processing device, the at least one memory having instructions stored thereon that, in response to execution by the at least one processing device, cause the at least one processing device to:
  determine, using one or more computer processors, the occurrence of a combination of an entry from the first dataset with multiple entries associated with the join key column identifier based, at least, in part on a number of occurrences of the combination of an entry from the first dataset with multiple entries associated with the join key column identifier and
  determine, using one or more computer processors, the occurrence of a combination of an entry from the accessed dataset with multiple entries associated with the column identifier of the accessed dataset corresponding to the join key column identifier based, at least, in part on a number of occurrences of a combination of an entry from the accessed dataset with multiple entries associated with the column identifier of the accessed dataset corresponding to the join key column identifier.

11. The data management system of claim 9, wherein entries associated with the join key column identifier include unique values and no null values.

12. The data management system of claim 9, wherein a format of a dataset is compatible with one or more of: Salesforce applications, comma-separated values (CSV) file, Hadoop, Structure Query Language (SQL) server, MySQL, Netezza, Oracle applications, or PostgreSQL.

13. The data management system of claim 9, comprising the at least one memory coupled to the at least one processing device, the at least one memory having instructions stored thereon that, in response to execution by the at least one processing device, cause the at least one processing device to:
apply a G-test of independence between the first dataset and each accessed dataset of accessed datasets other than the first dataset and
apply a chi squared distribution to rank as join candidates of the accessed datasets other than the first dataset.

14. The data management system of claim 13, comprising the at least one memory coupled to the at least one processing device, the at least one memory having instructions stored thereon that, in response to execution by the at least one processing device, cause the at least one processing device to:
identify join set candidates for the first dataset based on a pre-computed rank.

15. The data management system of claim 13, comprising the at least one memory coupled to the at least one processing device, the at least one memory having instructions stored thereon that, in response to execution by the at least one processing device, cause the at least one processing device to:
store a pre-computed rank for use prior to recommending at least one dataset candidate to join with the first dataset.

16. The data management system of claim 9, wherein determining, using one or more computer processors, a level of independence between the first dataset and the accessed dataset based at least, in part, on (i) an occurrence of a combination of an entry from the first dataset with multiple entries associated with the join key column identifier and (ii) an occurrence of a combination of an entry from the accessed dataset with multiple entries associated with the column identifier of the accessed dataset corresponding to the join key column identifier, wherein the determining comprises determining at least:

$$P(AB)=O(\text{first grouping with }A)*O(\text{first grouping with }B)/(P(\text{first grouping})*N2)+O(\text{second grouping with }A)*O(\text{second grouping with }B)/(P(\text{second grouping})*N2),$$

wherein
P(AB) represents a probability of A and B, A and B are paired with a same grouping,
A represents the entry from the first dataset,
B represent the entry from the accessed dataset,
the first grouping is multiple entries associated with the join key column identifier,
the second grouping is multiple other entries associated with the join key column identifier,
O represents an occurrence, and
N2 represents a number of rows in the first dataset.

17. A non-transitory computer-readable storage medium having instructions encoded thereon which, when executed by at least one processing device, cause the at least one processing device to:
access, using one or more computer processors, a first dataset from a memory device, the first dataset comprising at least one column identifier and associated entries;
access, using one or more computer processors, a dataset other than the first dataset, from a memory device, the accessed dataset other than the first dataset comprising at least one column identifier and associated entries, and for each accessed dataset other than the first dataset, performing:
identifying, using one or more computer processors, a join key column identifier of the first dataset corresponding to a column identifier of the accessed dataset;
determining, using one or more computer processors, a level of independence between the first dataset and the accessed dataset based at least, in part, on (i) an occurrence of a combination of an entry from the first dataset with multiple entries associated with the join key column identifier and (ii) an occurrence of a combination of an entry from the accessed dataset with multiple entries associated with the column identifier of the accessed dataset corresponding to the join key column identifier; and
recommending, using one or more computer processors, at least one dataset candidate to join with the first dataset based on the determined level of independence between the first dataset and the accessed dataset, the recommending comprising:
using one or more computer processors to cause display, in a remote graphical user interface, of a region displaying an identifier of the first dataset and at least one other join candidate dataset,
receiving an indication to join a selected dataset with the first dataset,
causing a formation of a composite dataset, using one or more computer processors, by joining the selected dataset with the first dataset, and
storing the composite dataset into a memory device.

18. The non-transitory computer-readable storage medium of claim 17 having instructions encoded thereon which, when executed by at least one processing device, cause the at least one processing device to:
determine, using one or more computer processors, the occurrence of a combination of an entry from the first dataset with multiple entries associated with the join key column identifier based, at least, in part on a number of occurrences of the combination of an entry from the first dataset with multiple entries associated with the join key column identifier and
determine, using one or more computer processors, the occurrence of a combination of an entry from the accessed dataset with multiple entries associated with the column identifier of the accessed dataset corresponding to the join key column identifier based, at least, in part on a number of occurrences of a combination of an entry from the accessed dataset with multiple entries associated with the column identifier of the accessed dataset corresponding to the join key column identifier.

19. The non-transitory computer-readable storage medium of claim 17, wherein entries associated with the join key column identifier include unique values and no null values.

20. The non-transitory computer-readable storage medium of claim 17, wherein a format of a dataset is compatible with one or more of: Salesforce applications, comma-separated values (CSV) file, Hadoop, Structure Query Language (SQL) server, MySQL, Netezza, Oracle applications, or PostgreSQL.

21. The non-transitory computer-readable storage medium of claim 17 having instructions encoded thereon which, when executed by at least one processing device, cause the at least one processing device to:
   apply a G-test of independence between the first dataset and each accessed dataset of accessed datasets other than the first dataset and
   apply a chi squared distribution to rank as join candidates of the accessed datasets other than the first dataset.

22. The non-transitory computer-readable storage medium of claim 21 having instructions encoded thereon which, when executed by at least one processing device, cause the at least one processing device to:
   identify join set candidates for the first dataset based on a pre-computed rank.

* * * * *